Figure 1:
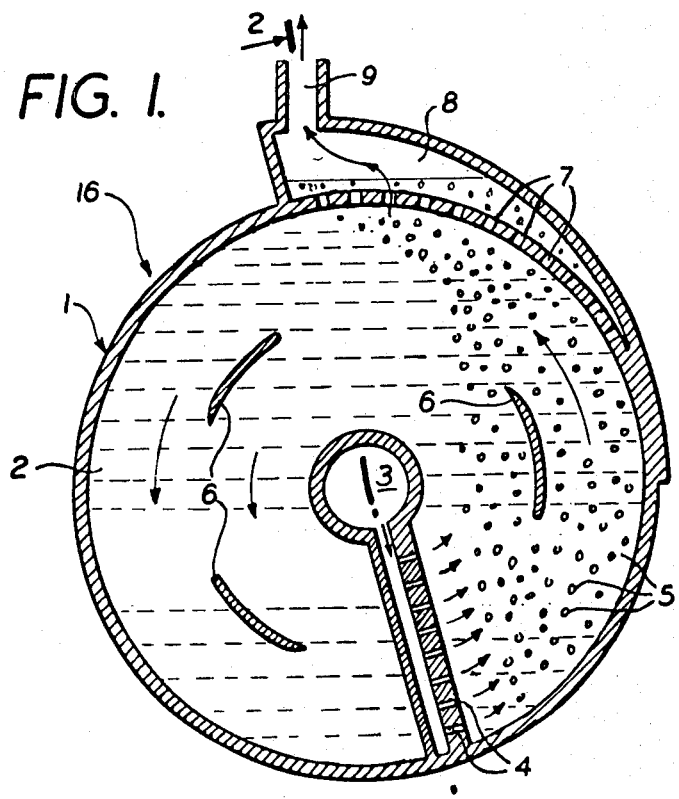

U.S. Patent Oct 12, 1976 3,985,581

CELL WITH CIRCULATING ELECTROLYTE

This application is a continuation of copending application Ser. No. 597,954, filed Nov. 30, 1966, and now abandoned.

This invention relates to current-producing electrochemical cells and, more particularly, to cells whose efficiency, useful life and applicability depend upon the interaction of one or more electrodes and an electrolyte in contact therewith.

The problems involved in the designing and use of current-producing electrochemical systems are manifold and, apart from structural considerations, derive from the interaction between an active material and the electrolyte. Such problems include those involving the redeposition of active material upon one of the electrode surfaces. For example, rechargeable batteries or cells utilizing zinc/zinc-oxide electrodes have been characterized heretofore by a phenomenon designated as "shape change", which is a progressive migration of the active material on the active electrode resulting in inactivation. Such difficulties have been attributed to the formation of concentration gradients within the electrolyte. Moreover, the presence of a diffusion layer adjacent an active electrode frequently renders electrochemical reaction thereat dependent upon the rate of diffusion, thus limiting the rate at which current can be withdrawn from the cell when the reaction produces electrode current.

It is the principal object of the present invention to provide a current-generating electrochemical system whereby the disadvantageous effects of electrolyte stratification, large-thickness diffusion layers and like efficiency-reducing phenomena can be significantly diminished and the cell life and useful current density improved, while affording a greater measure of control of the electrochemical reaction than possible heretofore.

A more specific object of this invention is to provide a relatively simple but effective method of and system for operating rechargeable current-producing cells and batteries for greatly extended periods without failure resulting from internal short-circuiting by electrode bridging as a consequence of zinc dendrite growth and diminished anode capacity as discussed above.

Still a further object of the invention is to provide a relatively simple but effective method of and system for operating rechargeable current-producing cells and batteries for greatly extended periods without failure resulting from shorting as a consequence of zinc dendrite growth and diminished anode capacity by substantially continuously displacing the electrolyte relative to the electrodes during electrochemical operation.

Another object of this invention is to provide means for producing in a current-generating electrochemical cell the maximum possible current of electrolyte with respect to the electrodes.

Yet another object of this invention is to provide means facilitating the controlled circulation of electrolyte in the vicinity of the electrode.

Still a further object of this invention is to provide means for rapidly moving the electrolyte present in the current generating electrochemical cell in such a manner as to reduce the tendency for dendritic structures to bridge the electrodes whereby the above noted disadvantages are avoided.

Yet another object is to provide means for controlling the porosity, the structure and the internal surface area of the metal deposited during charge.

Other and more detailed objects will be apparent from the following description.

The foregoing objects are realized in accordance with the invention by the discovery that it is possible to control the density and the type of deposit obtained from an electrolyte during charge/discharge cycling of a current-generating cell in such manner as to reduce the tendency for dendritic structures to bridge the electrodes, by causing the electrolyte present in the cell to move therein at a rate whereby such effects are avoided. It is desirable that the movement of the electrolyte in the cell be regulated so that the gradient is substantially reduced and the thickness of the diffusion layer sharply limited. The reduction of the concentration gradient and the thickness of the diffusion layer appears to be a consequence of the movement of the electrolyte over and past the electrodes of the cell assembly. The said movement of the electrolyte consists in a continuing and preferably rapid displacement of the electrolyte relative to the surface of the electrode receiving the deposit. This movement affords hydrodynamic control of the deposition action. It has been found, for example, that it is possible to regulate the density and porosity of the deposit at a zinc electrode in an electrochemical cell merely by controlling the speed of the electrolyte within the cell. Thus, at identical electrolyte concentrations, temperatures and charging-current densities, similar electrode surfaces can receive relatively dense deposits and relatively porous deposits merely by the use of higher and lower speeds of circulating electrolyte. While the present invention preferably contemplates the rapid movement of the electrolyte within a cell assembly, the lower limit of such rapid movement is determined only by the absence of shorting bridges and the upper limit is determined only by mechanical limitations. In accordance with the invention, it has been found to be desirable to select limits for the speeds such that the density of the deposit is at least 15% of that of the solid material and at most 90% thereof. These limits afford good results in terms of the porosity and tenacity of the active layers.

It has been suggested by others to circulate electrolyte in certain current-producing galvanic cells, for example for the purpose of removing products of reaction, by means of a circulating system at least partially external to the cell. In other words, it has heretofore been the practice to provide an electrolytic cell with channels and a storage system for introduction and withdrawal of electrolyte. Such recirculation requires considerable expenditure of energy, complex liquid-circulation systems and pumping arrangements, and relatively wide interelectrode spacings to ensure the necessary high flow rates. Further such recirculation systems tend to be bulky since the passages must be large enough to prevent clogging by precipitated zinc oxide loose electrode material and still further the pumping system must be capable of exerting the necessary force for introducing and withdrawing the electrolyte and for forcing the same through a filter system.

A still further disadvantage of the proposed system is manifested when such cells are assembled into multi-cell batteries, the external channels lead to common manifolds, so that the liquid contained therein may be subjected to voltages high enough to cause electrolysis of the electrolyte, which in turn results in energy losses flowing across the oxygen electrode into the electrolyte whence it is discharged via apertures 7 into air disentrainment chamber 8 and out throuh outlet 9.

The air is pumped from the compressor and is introduced via valve 11 into channel 13 and from thee discharged through apertures 4 into the body of electrolyte. The size of the apertures 4 is approximately 0.1 mm to 1 mm. The air discharges as a result in the form of multiple finely divided streams, the latter being rapidly divided into bubbles on introduction into the electrolyte. The electrolyte assumes a rotary motion in this case because of the general shape of the cell, manner of gas introduction and guide plate, the speed of rotation amounting to approximately 2 in/sec to 30 in/sec.

Figure 2:
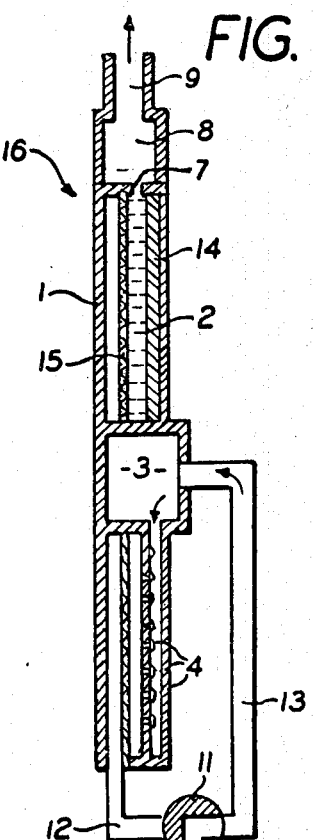
Figure 3:
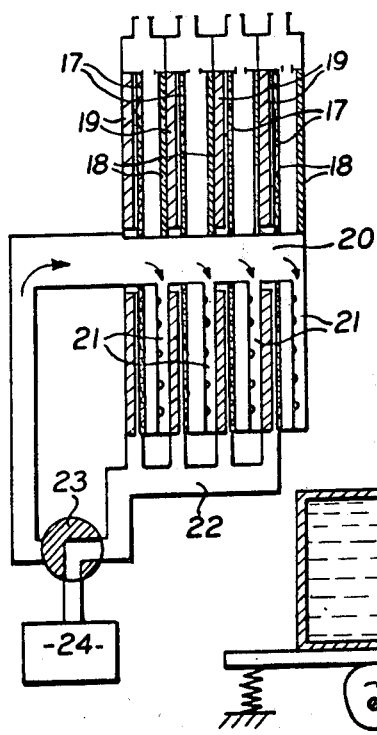

FIG. 3 illustrates a cell assembly or zinc/air battery utilizing a pile construction. As shown in the figure, four cells are assembled in a series arrangement wherein the air electrodes 17 are electrically connected to the electrodes 18 of opposite polarity of the next succeeding cell across metallic ribs 19 spacing the air compartment. Air under pressure is passed from compressor 24 via valve 23 into channel 20. From channel 20 the air is passed into channel 21 and out through the jet openings into the electrolyte as set out in detail in connection with FIGS. 1 and 2.

Channel 22 serves for conducting air to the oxygen electrodes. The valve 23 serves for directing the air either into the oxygen electrodes or into the electrolyte and is regulated according to the phase of operation i.e., charge or discharge. Reference numeral 24 designates the air compressor or pump.

While the embodiments shown in FIGS. 1–3 include an open feed system, that is a system wherein the depolarizing and movement-producing gas is, after use, discharged into the atmosphere, it may be appreciated that the invention is also applicable to a closed gas feed system comprising a hermetically sealed cell and a closed gas circulation circuit, e.g. a circuit in which gas is supplied to the cell from a reservoir in which it is stored under pressure and to which it is returned following passage through the cell. The gas is restored and maintained under pressure by means of a suitable gas compression device. In all other aspects, the cell corresponds to the structure as first described in connection with FIGS. 1–3.

Figures 4, 5:
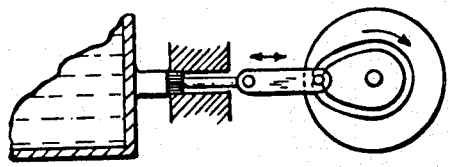

Referring to FIG. 4 which depicts another embodiment, the space between the two electrodes is occupied by a stirrer 25. The power utilized for driving the stirrer is derived from a drive motor 28 which serves to drive a driving magnet arranged on drive shaft 29 but located outside of the housing containing the electrodes and electrolyte. Inside of the housing but carried by the same drive shaft 29 is the driven magnet 26, the driven magnet 26 and/or shaft 29 carrying the stirring rod 25. The housing where the drive shaft enters the same is provided with a sealing ring 30 to assure a tight leakproof joint. Under the effect of the rotating motion imparted to the electrolyte by the stirrer 25, substantially the same effects as above set out in connection with the introduction of air into the electrolyte are achieved.

Figures 6, 7:
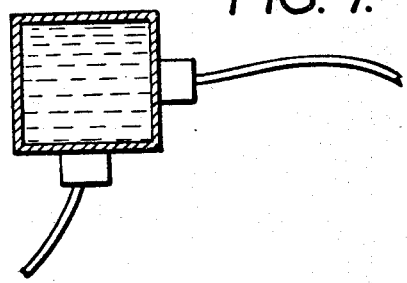

In FIGS. 5 and 6, a shaking motion is imparted to the electrolyte derived from a device capable of imparting a vibrating or oscillating type motion respectively to a body of liquid. As shown in FIG. 6, the device is in the nature of a vibrating table; of course other means as for instance an auxilliary vibrating housing would be equally suitable. The construction shown in FIG. 5 serves to impart oscillations to the body of liquid electrolyte. In place of the piston-plunger arrangement shown, any of the conventional oscillators may be used.

The construction shown in FIG. 7 illustrates another embodiment of the present invention. In this case, the means for inducing movement of the electrolyte are derived from an ultrasonic source.

We claim:

1. In a rechargeable electrochemical cell having a housing, a reversible metallic first electrode in said housing, and a gas-diffusion-type second electrode defining with said first electrode a first fluid space in said housing containing a liquid electrolyte, the combination therewith of:

a supply of depolarizing gas under pressure;
conduit means leading from said supply to said housing and terminating in an apertured element opening into said first fluid space, said conduit means including a branch opening into a second-fluid space adjacent a dry face of said second electrode and separated from said first fluid space by said second electrode;
and valve means for directing gas from said supply into said first fluid space through said apertured element during a charging phase for physically agitating said electrolyte, and into said second fluid space through said branch during a discharging phase for interaction with said second electrode to generate a current flow between said electrodes and a load.

2. The combination defined in claim 1 wherein said housing is substantially cylindrical, said element having apertures at different distances from the cylinder axis for injecting said gas into said first fluid space in a generally tangential direction whereby the electrolyte is set in unidirectional rotation about said axis.

3. The combination defined in claim 2, further comprising arcuate deflecting means in said housing for guiding the electrolyte about said axis.

4. The combination defined in claim 2 wherein said axis is horizontal, said conduit means forming an axial channel with a downward extension constituting said apertured element, said housing further having at least one port near its top for the escape of the injected gas and wall means forming an open receptacle for excess electrolyte above said port.

5. The combination defined in claim 1 wherein the metal of said first electrode is zinc.

6. A method of operating a rechargeable electrochemical cell having a reversible metallic first electrode and a gas-depolarizable second electrode in a housing also containing a liquid electrolyte between said electrodes, comprising the steps of charging said reversible electrode while admitting a stream of depolarizing gas from a high-pressure source into the space between said electrodes to set the electrolyte in continuous motion for physically agitating same, and thereafter discharging said reversible electrode while directing a stream of electrode-reactable gas from said source onto a dry face of said second electrode remote from the electrolyte for interaction therewith to generate a current flow between said electrodes and a load.

7. A method as defined in claim 6 wherein said depolarizing gas is air.

* * * * *

United States Patent [19]
Bibring et al.

[11] 3,985,582
[45] Oct. 12, 1976

[54] PROCESS FOR THE IMPROVEMENT OF REFRACTORY COMPOSITE MATERIALS COMPRISING A MATRIX CONSISTING OF A SUPERALLOY AND REINFORCING FIBERS CONSISTING OF A METAL CARBIDE

[75] Inventors: Herve Bibring, Meudon; Jean-Pierre Trottier, Bagneux; Tasadduq Khan, Plessis-Robinson; Jean-Francois Stohr, Bourg-la-Reine; Maurice Rabinovitch, Chatillon, all of France

[73] Assignee: Office National d'Etudes et de Recherches Aerospatiales (O.N.E.R.A.), Chatillon, France

[22] Filed: July 18, 1974

[21] Appl. No.: 489,482

[30] Foreign Application Priority Data
July 30, 1973 France .............................. 73.27854

[52] U.S. Cl. .................................... 148/3; 148/2; 148/32.5; 148/39; 148/158; 148/162; 75/171
[51] Int. Cl.² .................... B22D 25/00; C22C 19/05

[58] Field of Search ................. 75/170, 171; 148/2, 148/3, 32, 32.5, 162, 158, 34, 39

[56] References Cited
UNITED STATES PATENTS

| | | | |
|---|---|---|---|
| 3,649,378 | 3/1972 | Kotval................................. | 75/171 |
| 3,649,379 | 3/1972 | Kotval................................. | 75/171 |
| 3,753,790 | 8/1973 | Walker et al. .......................... | 148/3 |
| 3,783,032 | 1/1974 | Walker et al. .......................... | 148/3 |
| 3,793,010 | 2/1974 | Lemkey et al. ........................ | 75/171 |
| 3,793,012 | 2/1974 | Walter et al. ......................... | 75/171 |
| 3,793,013 | 2/1974 | Walter et al. ......................... | 75/171 |
| 3,871,835 | 3/1975 | Bibring et al. ........................ | 75/170 |

*Primary Examiner*—Walter R. Satterfield
*Attorney, Agent, or Firm*—Karl F. Ross; Herbert Dubno

[57] ABSTRACT

Composite materials which comprise a matrix of a complex refractory superalloy and embedded in said matrix filiform particles of carbide and, in the matrix, a fine precipitation of carbide of the same nature as the one of the filiform particles.

7 Claims, 8 Drawing Figures